Aug. 31, 1937.　　　　　G. LARGE　　　　　2,091,823
AGRICULTURAL MACHINERY
Filed July 9, 1936　　　　2 Sheets-Sheet 1

Inventor
George Large
By John W. Michael
Attorney

Aug. 31, 1937.  G. LARGE  2,091,823
AGRICULTURAL MACHINERY
Filed July 9, 1936  2 Sheets-Sheet 2
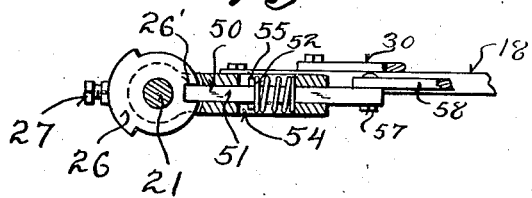
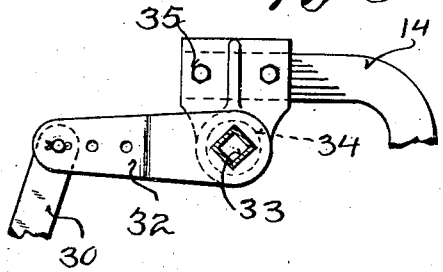
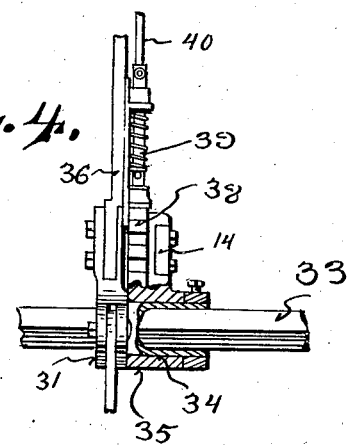
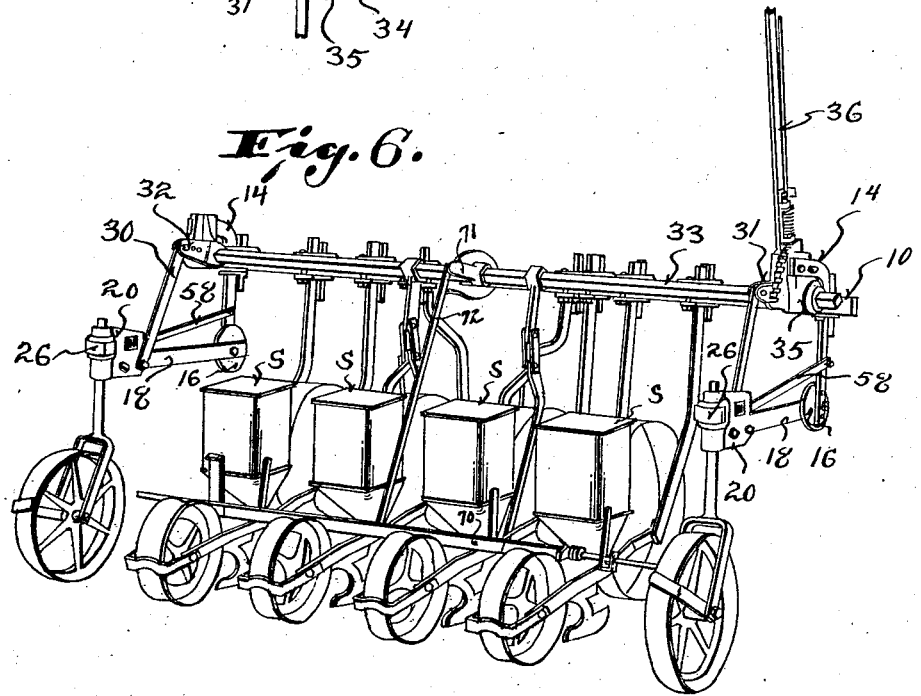
Inventor
George Large
By John W. Michael
C. Horssey Patented Aug. 31, 1937

2,091,823

UNITED STATES PATENT OFFICE 2,091,823

AGRICULTURAL MACHINERY

George Large, Port Washington, Wis., assignor to Gilson Bolens Manufacturing Company, Port Washington, Wis., a corporation of Wisconsin Application July 9, 1936, Serial No. 89,747

15 Claims. (Cl. 97—48)

This invention relates in general to agricultural machinery, particularly of the type designed for use in truck or garden farming. The machine is not restricted to use with any particular type of implement. For example, it may be used advantageously with cultivators, seeders, harrows, or the like.

In the type of machine contemplated by the present invention, an internal combustion engine such as a gasoline engine is mounted on two front wheels and is connected with the wheels by clutch controlled gearing. The clutches are controlled from suitable operating levers disposed adjacent the handles of the machine, which handles are extended rearwardly and are grasped by the operator during the operation of the machine. On a suitable transverse bar or frame member supported in part from a frame carried by the front wheels and also in part by trailing wheels, the implements such as the cultivators, seeders, or harrows are suspended. Between the rear wheels and the implement carrying bar is a lever or toggle mechanism which is employed as a lift when it is desired to raise the implements out of the ground. It is always desirable to do the latter when turning at the end of a row. When traveling along the row it is desirable to have the trailing wheels operate as straight wheels, that is, they should be constrained to rotate about a horizontal axis but in a vertical or fixed wheeled plane, which wheeled plane is parallel to the line of movement of the machine. This aids the operator in traveling properly along the row. At the end of the row when the machine is to be turned around the lift is operated to lift the implements out of the ground and then the machine must be swung around. At such times it is desirable to have the trailing wheels operate as casters, that is, to be free to swing about a vertical axis in order to follow and facilitate the turning movement.

The present invention proposes to provide trailing wheels which are convertible from straight wheels to caster wheels and which has a latch or other means regulating the conversion of the wheels and co-ordinated in its action with the lifting mechanism so that when the implements are lifted by said mechanisms the trailing wheels are automatically converted into casters and yet when the lift is lowered and the implements brought into operative relation to the ground the trailing wheels are automatically shifted over to straight wheels.

A further object of the invention is to provide an agricultural machine of this character and having the advantages and capacities mentioned and which is simple and durable in its construction, reliable and effective in operation and easily controlled both when traveling straightway when traversing the row and also when turning at the end of a row.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 3 is a detail view in horizontal cross section taken on line 3—3 of Figure 2;

Figure 4 is a fragmentary view partly taken on line 4—4 of Figure 2, with parts shown in elevation for the sake of simplicity in illustration;

Figure 1:
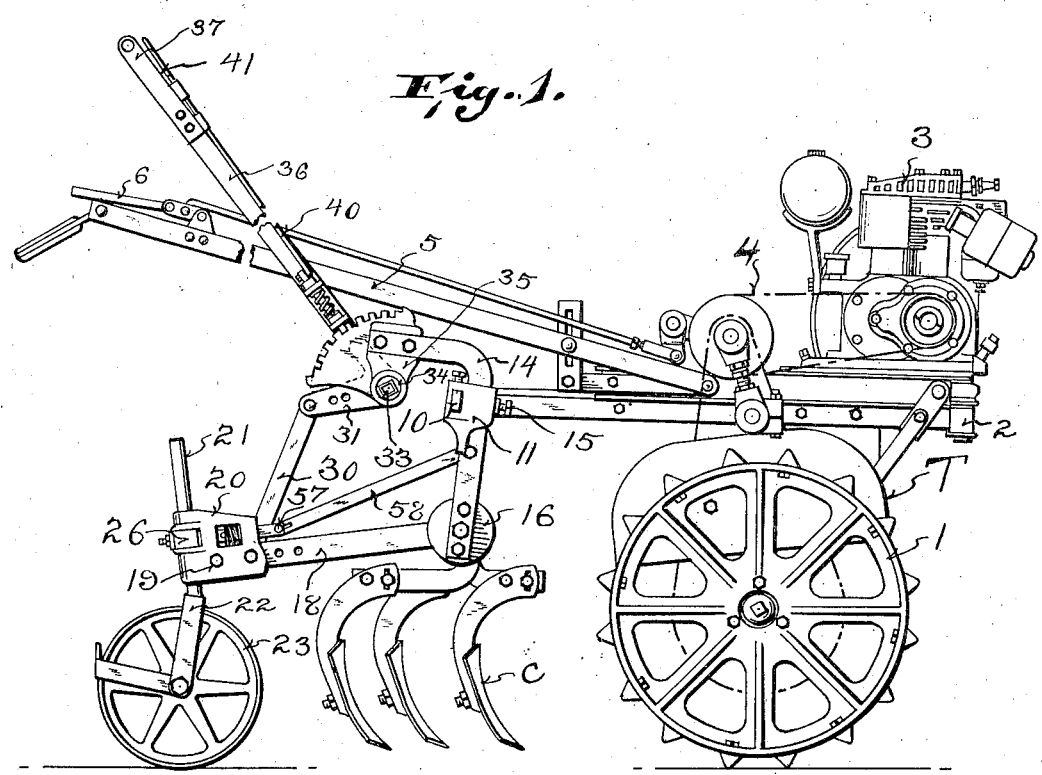
Figure 1 is a view in side elevation showing an agricultural machine embodying the present invention and illustrated as equipped with cultivators.

Figure 5 is a fragmentary view partly in side elevation and partly in vertical section showing the crank connected to the lift shaft at the opposite side of the machine from that at which the hand lever of the lift mechanism is located; and Figure 6 is a fragmentary view showing the implement carrying bar and lift associated with seeders, the tractor and handles and associated instrumentalities being omitted for the sake of simplicity in illustration.

Referring to the drawings, the tractor at the forward end of the machine is designated generally at T. The tractor T is of conventional construction and has suitable ground wheels of which one is shown at 1. A suitable frame 2 is mounted on the ground wheels and supports an engine 3 which is connected to the ground wheels by a suitable clutch controlled gearing illustrated diagrammatically at 4. Handles 5 are connected to the frame 2 and extend rearwardly therefrom and are adapted to be grasped by the operator and used in controlling the direction of movement of the vehicle. Suitable operating or control levers 6 regulate the action of the clutch controlled gearing and of the engine.

The patent to F. V. Donald No. 1,734,716, granted November 5, 1929, for a transmission unit, discloses and claims a tractor of the type here contemplated.

On the rearward end of the frame 2 an implement carrying bar 10 is suitably secured and from this bar the implements or earth working means are suspended. In Figure 1 these implements are shown as cultivators C, whereas in the form shown in Figure 6 they are shown as consisting of seeders S.

Brackets 11, one at each side of the machine, are mounted on the bar 10 and are secured in position on the bar by means of set screws 12. These brackets 11 have transverse openings through which the bar 10 extends and they also have vertical openings accommodating the substantially vertical portions 13 of lift frame members designated generally at 14. The frame members 14 are secured in vertical adjustment by means of a set screw 15. Discs 16 are pivotally secured as at 17 to the lower ends of the portions 13 of members 14 and they are also fixedly secured to the rearward ends of arms 18. The forward ends of these arms 18 are fastened by bolts 19 to castings or blocks 20.

Figure 2:
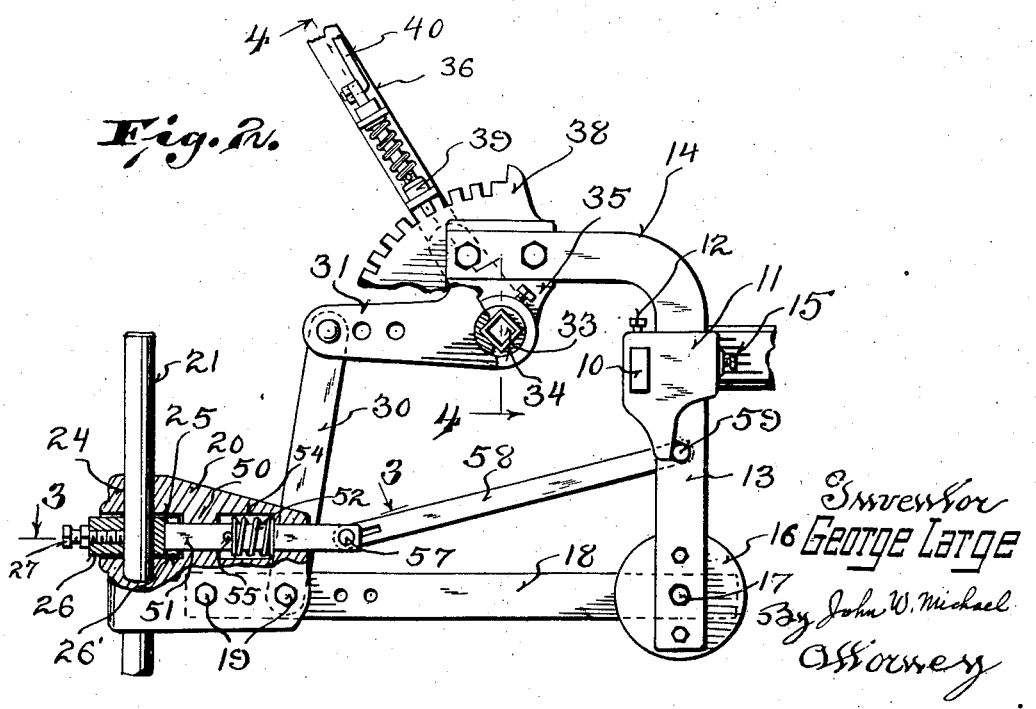
Figure 2 is a fragmentary view on a somewhat enlarged scale and illustrating the lift mechanism and the trailing wheel control means partly in side elevation and partly in vertical section.

As shown in Figure 2, these blocks 20 provide the bearings for the stems or shafts 21 of the forks 22 of trailer wheels 23. For this purpose, the blocks 20 have vertical openings 24 therethrough, in which portions of the shafts 21 are rotatably fitted. Each block 20 also has a recess 25 which intersects the vertical opening 24. Each recess 25 accommodates a collar 26 secured to its shaft 21 by a lock screw 27 and functions to preclude vertical movement of its shaft 21 relative to its block 20 while leaving its shaft 21 free to rotate with the collar when the collar is free to rotate.

Links 30 are provided, one such link being associated with each block 20 and having its lower end pivotally connected thereto. The upper ends of the links are connected to the outer ends of the crank arms 31 and 32 which are fixed to and rotatable with a lift shaft 33. The lift shaft 33 is preferably square or of non-circular cross section but adjacent its ends it is provided with bushings 34 (see Figure 4), the peripheries of which are cylindrical. These bushings 34 are rotatably fitted in bearing brackets 35 fastened to the outer ends of the frame member 14. The openings in the crank arms 32 through which the shaft 33 passes are of the same form as the shaft 33 and are dimensioned to tightly fit thereon.

For rotating the shaft and securing the same in the position to which it is rotated, a hand lever 36 is provided and has its lower end fixed to the shaft 33 and its outer end provided with a hand grip 37. The hand lever is disposed adjacent to a toothed segment 38 fixed to one of the frame members 14. A spring biased detent 39 is slidably mounted on the hand lever 36 and is urged by its spring into engagement with the teeth of the segment 38 to maintain the shaft in the position to which it is adjusted. A release rod 40 is connected to the detent 39 and has a gripping portion 41 adjacent the hand grip 37. When the release rod 40 is pulled outwardly the detent is disengaged from the teeth of the quadrant and the hand lever may be employed to rotate the shaft 33.

When the hand lever is pulled down the shaft 33 is rotated in a counter-clockwise direction as viewed in Figure 1 so that the crank arms 31 and 32 and their links 30, which, in effect, provide toggles, are straightened out. As a result of this the hangers 14 and consequently also the implement bar 10 are raised to lift the implements off the ground.

When the implements C are lowered the present invention proposes to lock the trailer wheels 23 against rotation but when the implements are raised these trailer wheels are released for free rotation about their vertical axis. For this purpose each block 20 is formed to provide a guideway 50 for a latching bolt 51. The bolt 51 is slidable in its guideway and urged forwardly therein by a spring 52. Spring 52 encircles the bolt 51 within a recess 54 provided in the block 20 and abuts the wall of the recess at one end and a cross pin 55 on the latching bolt at its other end. The forward end of the bolt 51 projects into the recess 25 and into position to engage in a notch 26' provided in the collar 26. The rearward end of the latching bolt projects rearwardly beyond the block 20 and has a pin and slot connection 57 with one end of a link 58, the other end of the link being pivotally connected as at 59 to its hanger 14.

When the hand lever 36 is swung downwardly and the toggles constituted by the links 30 and crank arms 31 and 32 straightened, the distance between the pivot points 59 of the links 58 and their pin and slot connections 57 with the latching bolts 51 are increased. As a consequence the links 58 are pulled away from the latching bolts 51 and due to their connection with them pull the bolts 51 rearwardly and disengage them from the notches 26', thus freeing the wheels 23 to swivel. On the other hand when the hand lever 36 is readjusted to lower the implements to the ground, the link 58 allows the bolt 51 to respond to its spring 52 so that as the wheels 23 swing around to their normal position, and they do this automatically as the machine moves forward, they are automatically latched to rotate in their proper wheel plane.

One feature of advantage inherent in the construction described is that but a single lever is required to operate all of the various instruments, the lever acting through the square shaft 33 from which the other devices are all collected. The lever can be changed from right hand to left hand.

In connection with the seeder it is to be understood that the seed hoppers have at their outlets the usual valve or closure which functions when in closed position to prevent the discharge of seed but which, when opened, allows the seed to pass out of the hopper. These valves are under the control of a common control bar 70 (see Figure 6) and the control bar 70 is in turn regulated in its action from the lift shaft 33. For this purpose the lift shaft 33 has a crank arm 71 fixed thereto and pivotally connected to the upper end of a link 72, the lower end of the link 72 being appropriately connected to the control bar 70. When the hand lever 36 is pulled downwardly to elevate the seeders, the crank 71 acts through the link 72 and control bar 70 to automatically move the valves or closures of the outlets of the seed hoppers to closed position to shut off the flow of seed. When the seeders are lowered upon reverse manipulation of the hand lever the action is reversed and the arm 71, link 72 and control bar 70 open the valves in the outlets of the seed hoppers to allow for free flow of seed.

While I have shown and described one construction in which the present invention may be embodied, it is to be understood that this construction has been selected merely for the purpose of illustration or example, and that various changes in the size, shape and arrangement of the parts may be made without departing from the spirit of the invention or the scope of the subjoined claims.

The invention claimed is:

1. A machine of the character described comprising a tractor, a frame therein including an implement carrying bar, implements suspended therefrom, trailer wheels connected to said bar, a hand operated lift mechanism between said wheels and said bar, and means regulated in its action by said lift mechanism for converting said wheels from straight wheels to caster wheels and vice versa.

2. A machine of the character described comprising a tractor, a frame therein including an implement carrying bar, implements suspended therefrom, trailer wheels connected to said bar, a hand operated lift mechanism between said wheels and said bar, releasable latches for normally constraining said wheels to act as straight wheels and means actuated by said lift mechanism for releasing said latches to allow said wheels to operate as caster wheels when said lift mechanism is elevated.

3. A machine of the character described comprising a tractor, a frame therein including an implement carrying bar, implements suspended therefrom, trailer wheels connected to said bar, a hand operated lift mechanism between said wheels and said bar, releasable latches for normally constraining said wheels to act as straight wheels and links interconnecting said latches and said lifting mechanism for releasing said latches to allow said wheels to operate as caster wheels when said lift mechanism is elevated.

4. A machine of the character described comprising a tractor, a frame thereon, implements suspended from said frame, trailer wheels, means interconnecting said wheels and said frame whereby the frame may be supported from said wheels at different elevations, releasable means operable to constrain said wheels to rotate in fixed wheel plane, and release mechanism operable to release said means when said frame and implements are elevated.

5. A machine of the character described comprising a tractor, a frame thereon, implements suspended from said frame, trailer wheels, toggle linkage interconnecting the wheels and the frame and operable to elevate the frame and lift the implements off of the ground, latches operable to constrain the wheels to rotate in a fixed wheel plane, and means for releasing said latches when the toggle mechanism is operated to elevate the frame.

6. A machine of the character described comprising a tractor, a frame thereon, implements suspended from said frame, trailer wheels, forks for said wheels, bearing blocks in which said forks are rotatably mounted, a link connecting said blocks and said frame, a toggle between each of said blocks and said frame and operable to elevate the frame, a latch associated with each block and operable to constrain the associated wheel to rotation in a fixed wheel plane, and a connection between the latches and the frame operable to release the latches when the frame is elevated.

7. A machine of the character described comprising an implement carrying bar, implements suspended from said bar, lift frame members mounted on the ends of said bar, trailer wheels, forks for said trailer wheels, bearing blocks for said forks, links connecting said blocks and the lower ends of said lift frame members, and hand operated toggle mechanism between said lift frame members and said blocks, whereby the lift frame members and the implement carrying bar may be elevated.

8. A machine of the character described comprising an implement carrying bar, implements suspended from said bar, lift frame members mounted on said bar, trailer wheels, forks for said trailer wheels, bearing blocks for said forks, links connecting said blocks and the lower ends of said lift frame members, hand operated toggle mechanism between said lift frame members and said blocks whereby the lift frame members and the implement carrying bar may be elevated, latches for holding said forks against rotation, and links between said latches and said lift frame members for releasing said latches when said lift frame members are elevated.

9. A machine of the character described comprising an implement carrying bar, implements suspended from said bar, lift frame members mounted on the ends of said bar, trailer wheels, forks for said trailer wheels, bearing blocks for said forks, links connecting said blocks and the lower ends of said lift frame members, hand operated toggle mechanism between said lift frame members and said blocks including brackets mounted on said bar, a shaft rotatable in said brackets, crank arms fixed to said shaft, links between said crank arms and said bearing blocks and means for rotating said shaft and holding it in adjusted position.

10. A machine of the character described comprising an implement carrying bar, implements suspended from said bar, lift frame members mounted on the ends of said bar, trailer wheels, forks for said trailer wheels, bearing blocks for said forks, links connecting said blocks and the lower ends of said lift frame members, hand operated toggle mechanism between said lift frame members and said blocks including brackets mounted on said bar, a shaft rotatable in said brackets, crank arms fixed to said shaft, links between said crank arms and said bearing blocks, means for rotating said shaft and holding it in adjusted position, and means coacting with said forks and controlled in its action from the lift frame members for causing said trailer wheels to function as straight wheels operable in a fixed wheel plane when said frame members are lowered and to function as caster wheels when said frame members are raised or lifted.

11. A machine of the character described comprising a tractor, a frame thereon, an implement suspended from said frame, trailer wheels, toggle linkage interconnecting the wheels and the frame and operable to elevate the frame and lift the implement off the ground, latches operable to constrain the wheels to rotate in a fixed wheeled plane, and means co-ordinated in its action with the toggle mechanism and operable to release the latches automatically when the toggle mechanism is actuated to elevate the frame.

12. A machine of the character described comprising a tractor, a frame thereon including an implement carrying bar, an implement suspended therefrom, trailer wheels connected to said bar, a lift mechanism between said wheels and said bar, and means co-ordinated in its action with the lift mechanism and functioning to automatically convert said wheels from straight wheels to caster wheels and vice versa.

13. A machine of the character described comprising a tractor, a frame thereon including an implement carrying bar, a seeder suspended from said bar, trailer wheels connected to said bar, a hand operated lift mechanism between said wheels and said bar, means regulated in its action by said lift mechanism for converting said wheels from straight wheels to caster wheels and vice versa, and means automatically operated when the lift mechanism and seeder are elevated to preclude flow of seed from said seeder, while providing for the flow of seed therefrom when the lift mechanism and seeder are lowered.

14. A machine of the character described comprising a tractor, a frame thereon, including an implement carrying bar, a seeder suspended from the bar, trailer wheels connected to the bar, a lift mechanism between said wheels and said bar including a hand operated lift shaft, and means acting to prevent flow of seed when the seeder is elevated while allowing flow thereof when the seeder is lowered including a control bar associated with the seeder, a crank secured to said lift shaft and a link connecting the crank and the control bar.

15. A device of the character described comprising a tractor having a frame, an implement carrying bar secured to said frame, implements suspended from said bar, lift frame members supported on said bar, trailer wheels, bearings for said trailer wheels, links between the lower portions of said lift frame members and said bearings, a lift shaft of non-circular cross section, means for supporting said lift shaft for rotation on the upper portion of said lift frame members, toggle linkage between said lift shaft and said bearings and a single hand lever fixedly interconnected with said lift shaft, said lift shaft due to its non-circular cross section being adapted to be fixedly interconnected with said hand lever and the other elements to be operated thereby at various points along its length.

GEORGE LARGE.